D. C. SMITH.
Corn Husker.
No. 24,958.
Patented Aug. 2, 1859.
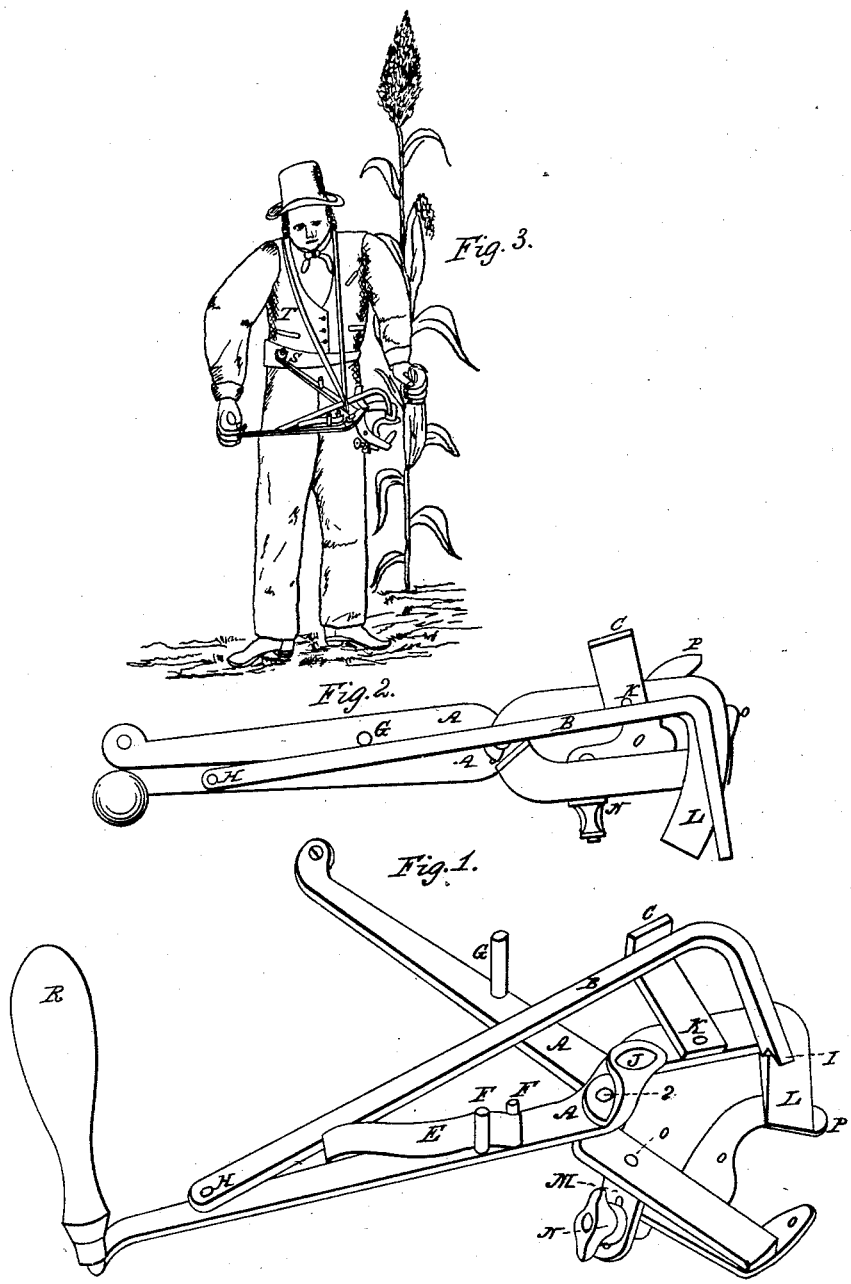
Witnesses:
J. J. Snell
M. Smit
Inventor:
Daniel C. Smith

UNITED STATES PATENT OFFICE.

DANIEL C. SMITH, OF TECUMSEH TOWNSHIP, MICHIGAN.

CORN-HUSKER.

Specification of Letters Patent No. 24,958, dated August 2, 1859.

*To all whom it may concern:*

Be it known that I, DANIEL C. SMITH, of Tecumseh, Lenawee county, State of Michigan, have invented a new and useful Improvement in Corn-Husking Machines; and I do hereby declare that the following is a full, clear, and exact description of the construction and operation of the same, reference being had to the accompanying drawings, making a part of this specification.

The nature of my invention consists in so constructing a husking machine that it frees the corn from the silk at the same time it frees it from the husk, and removes the husks from the machine after it has husked an ear of corn while opening it to husk another ear.

Figure 1 of the accompanying drawings is a perspective view of my machine, exhibiting its several parts; viz: forceps marked A, lever B, with its spur I, stop C, spring E, pins F, post G, pivot H, ring J, knife L, post M, nut N, fork O, hook P and handle R. Fig. 2, exhibits the machine from a point of view directly above the same closed, as it appears after husking an ear of corn. Fig. 3, exhibits the machine attached to the waist of the operator ready for use.

The fork O, is secured to the post M, by means of the thumb nut N, said post being firmly attached to the forceps A, at Q, the shank of the fork O, that the nut N, screws on passes through the slot seen in post M, which admits of the fork being raised or lowered at the option of the operator, for the purpose of gaging the ear so that no corn need be wasted, and no husks left on the ear. One of the prongs of fork O, is longer than the other, and bent around under the knife so as to form the hook P. The object of the hook P, is to remove the husk from the knife when the machine is being opened preparatory to the husking of another ear of corn.

I will describe the operation of my machine as follows, viz: The operator puts the strap T, through the ring J, which is secured to forceps A, by their pivots 2, 2; he then places the strap over his neck and attaches one handle of the machine to the pad around his waist by means of the hinge S; he then grasps the handle R, with one hand and the ear of corn with the other by its top as is seen in Fig. 3. To husk the ear he opens the machine as seen in Figs. 1 and 3, that allows the spring E, which is secured to forceps A, by means of the pins F, to throw the lever B, that is attached to forceps A, by its pivot H, back till it strikes the stop C, said stop C, being secured to the forceps A at R. He then places the stem of the ear of corn in the fork O, which is wide enough to receive the stem but not the ear; he then presses the butt of the ear hard down on the fork O, and with the other hand grasping the handle R, he closes the machine which forces the knife through the husk and butt of the ear of corn separating the ear from the stem. The lever B, is caused to close simultaneously with the knife by means of the stop C, which is attached to forceps A, at K. When the machine is closed on the ear enough to separate it from the stem, the point of the lever B, which lies on the top of the knife presses against the side of the ear at its butt. The spur I, pierces the husk and sticks into the side of the ear. The machine is then about half closed, the knife being long enough to have passed through the ear and husk on the opposite side of the ear. The butt of the ear is forced out of the hole made by the knife by means of the lever B. When the machine is about three quarters closed the resistance of the husk holds the ear hard enough against the spur I, to cause said spur to stick into the side of the ear when the machine closes. At this point the ear is bare and out of the husk, the top of the ear still remaining in the husk with the operator holding on to the top of the husk and silk. The lever B, then is struck at this point of closing the machine by the post G, which imparts a rapid motion to the lever B, sufficient to drive the ear out of the husk and leave the silk in the top of the husk in the hand of the operator, when the point of the lever assumes the position as seen in Fig. 2.

What I claim and desire to secure by Letters Patent is—

1. The above described improvement in corn huskers, consisting of the combination of forceps A, lever B, stop C, spring E, and post G, in the manner and for the purposes specified.

2. I claim the combination with the forceps A, of the slotted post M, nut N, and fork O, in the manner and for the purposes specified.

DANIEL C. SMITH.

In presence of—
   FRANCIS S. SNELL,
   M. SMITH.